(No Model.) 2 Sheets—Sheet 1.

A. D. BEEDLE.
VEHICLE AWNING.

No. 379,356. Patented Mar. 13, 1888.

Witnesses.
F. G. Fischer.
A. Mason.

Inventor.
Augustus D. Beedle
By J. C. Higdon,
Attorney.

(No Model.) 2 Sheets—Sheet 2.
A. D. BEEDLE.
VEHICLE AWNING.
No. 379,356. Patented Mar. 13, 1888.
*Fig. 1. a.*
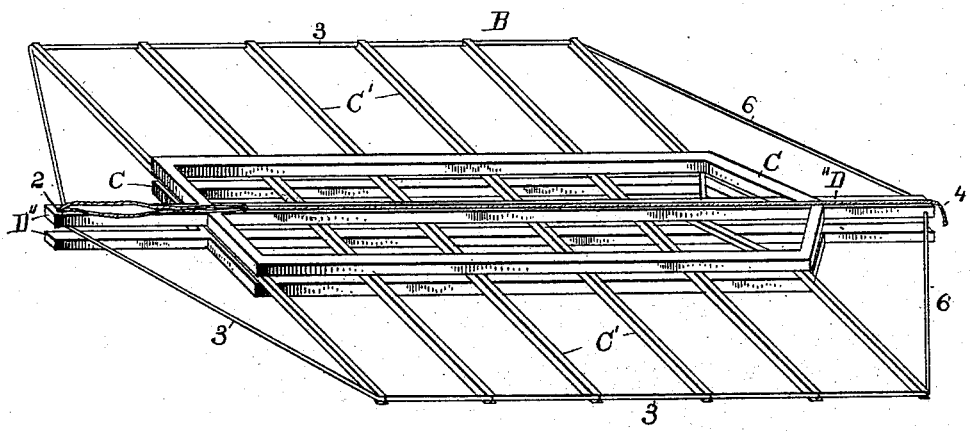
*Fig. 2. b.*
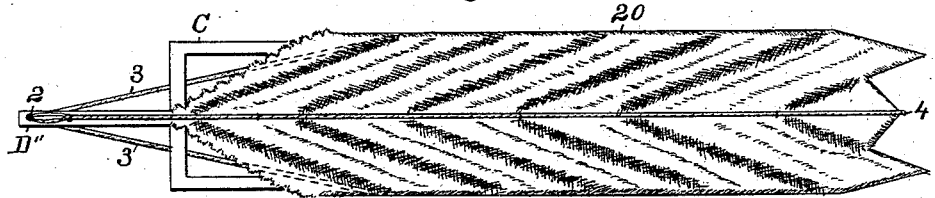
*Fig. 3. c.*
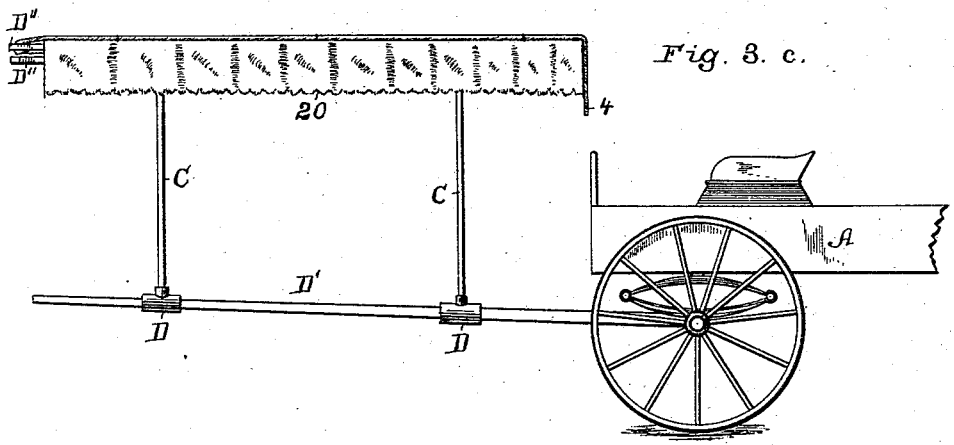
*Fig. 4. d.*
Witnesses.
F. G. Fischer.
A. Mason.
Inventor.
Augustus D. Beedle.
By J. C. Higdon, Attorney.

UNITED STATES PATENT OFFICE.

AUGUSTUS D. BEEDLE, OF KANSAS CITY, MISSOURI.

VEHICLE-AWNING.

SPECIFICATION forming part of Letters Patent No. 379,356, dated March 13, 1888.

Application filed January 19, 1888. Serial No. 261,212. (No model.)

*To all whom it may concern:*

Be it known that I, AUGUSTUS D. BEEDLE, of Kansas City, Jackson county, State of Missouri, have invented certain new and useful Improvements in Vehicle-Awnings, of which the following is a full, clear, and exact description, reference being had to the accompanying drawings, forming a part thereof.

This invention relates to vehicle-awnings that are adapted to be folded without removal from stationary support; and it consists in the peculiar construction, combination, and arrangement of devices hereinafter set forth, and pointed out in the claims.

Figure 1:
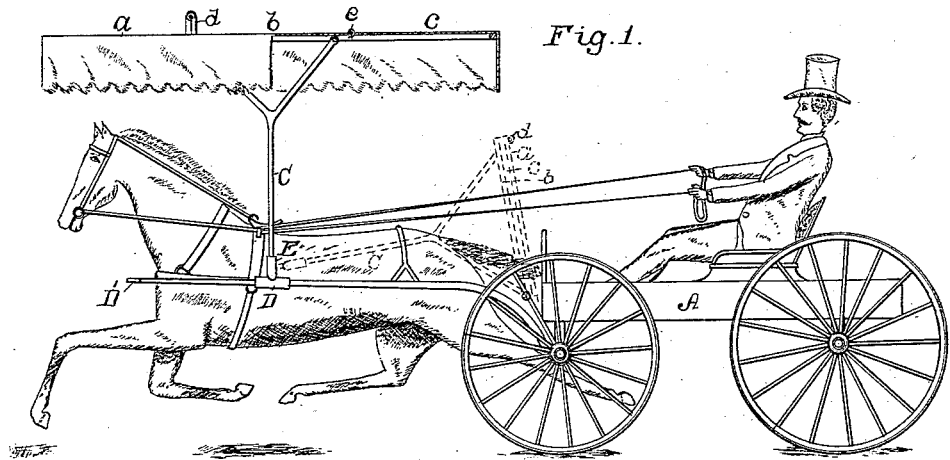
Figure 2:
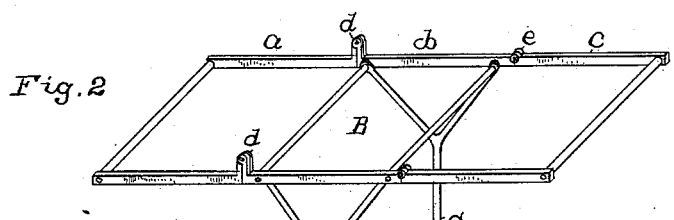
Figure 3:
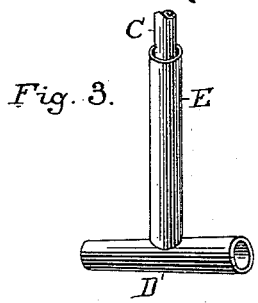
Figure 4:
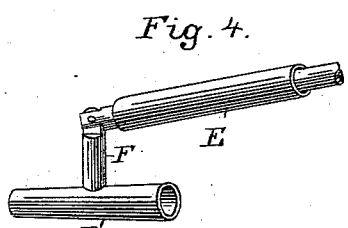
Figure 5:
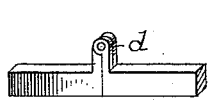
Figure 6:
Figure 7:
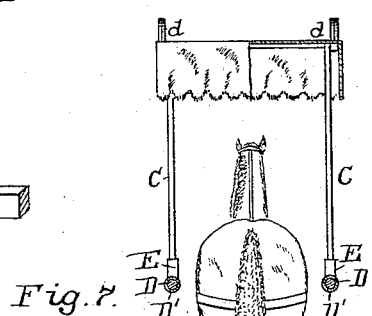

In the drawings, which illustrate the manner of carrying out my invention, Figure 1 is a side elevation showing the awning applied to a vehicle having shafts. Fig. 2 is a perspective view of the skeleton frame as applied to shafts, the canvas covering being removed. Fig. 3 is a broken detail view showing the devices used for connecting the standards with the shafts. Fig. 4 is a detail view of these last-named parts in the position they assume when the awning is folded and laid back behind the horse. Fig. 5 is a detail showing the raised hinge used to connect two of the folding sections. Fig. 6 is a like view showing the ordinary hinge used for the same purpose. Fig. 7 is a sectional rear view showing the position of the awning above the horse when in use. Fig. 1ª is a perspective view of the varied form of skeleton frame used on center-draft or pole vehicles. Fig. 2ᵇ is a plan view of the varied form of awning in a folded position. Fig. 3ᶜ is a side elevation showing the awning applied to a vehicle having a pole. Fig. 4ᵈ shows the pivoted arms.

In the first seven figures of the drawings, A represents a vehicle having shaft D', to which the frame B is connected by standards C and thimbles D. The said thimbles are provided with a vertical lug, F, and the lower ends of said standards are hinged to the lug, so that they can be laid backward. Another thimble, E, is located on the standards in a loose condition, so that when the standards are to be laid down said thimble E can be slid upwardly until the hinged joint between the lug F and the standards is uncovered thereby, thus permitting such operation to be performed. Likewise, when the standards are to be held in an upright position said thimble E is slid down over the said joint, holding the parts rigidly in position until again purposely disturbed.

The awning-frame for the shafted vehicle consists of three or more sections, *a*, *b*, and *c*, respectively, made up of side and end bars of any ordinary material, and preferably of rectangular form.

The upper ends of standards C are forked and permanently secured to the central section, *b*, while the forward section, *a*, is hinged to said central section by means of a raised hinge, *d*, (shown more clearly in Fig. 5,) and the rear section is hinged to the rear end of the central section by means of any ordinary style of hinge, such as *e*.

In operation, to fold the awning, rear section, *c*, is first folded upwardly and inwardly upon the central section, *b*, then the forward section is folded down on the rear section, (the raised hinge *d* permitting this,) after which the thimble E is slid upwardly and the entire frame is laid back behind the horse, as shown by dotted lines in Fig. 1.

In the varied form of awning for use upon poled vehicles illustrated in Figs. 1ª, 2ᵇ, 3ᶜ, and 4ᵈ, the vertical standards C are not to be laid down, but are rigidly secured upon the pole D' by thimbles D, or other devices. Upon the upper ends of said standards are permanently or rigidly mounted the several parts composing the folding awning.

C indicates a double frame, between which the arms C' are pivoted so as to fold backward, as shown in Fig. 2ᵇ. Said arms have their inner ends pivoted to the central bars, D″, as shown in Fig. 4ᵈ, while they extend outwardly between the two frames C, and a cord or rope, 3, is passed around their outer ends, and the canvas 20 is attached to said rope in any desired manner; or, if so desired, the rope can be dispensed with and the canvas attached directly to the arms. The forward end of rope 3 is passed through a hole, 2, in the front end of central bar, D″, and extends back over the top of the awning within easy reach of the driver, as shown.

The operation of this varied construction is as follows: To close the awning to the position indicated in Fig. 2ᵇ, the rear portions, 6, of rope 3 are drawn rearwardly, and to distend the awning the end 4 of the rope is to be pulled rearwardly by the driver, all of which will readily be understood by reference to the drawings.

Thus constructed the awning may be folded into comparatively small compass, between the horses and out of the way.

This awning is particularly adapted for use on agricultural implements and machinery—such for instance, as sulky-plows, mowers, and harvesters.

Having thus described my invention, what I claim is—

1. A folding vehicle-awning supported upon vertical standards, said standards being hinged at their lower ends to the shafts of the vehicle, and said awning being constructed to fold into smaller compass and be laid down in rear of the horse, substantially as described.

2. Frame B, in combination with standards C, which support it over the horse, the upper ends of said braces being rigidly attached to said frame, and their lower ends being hinged or loosely connected to the vehicle-shafts, whereby said frame may be laid down in rear of the horse, substantially as described.

3. The combination, with the shafts of the vehicle, of thimbles D, having vertical lugs F, standards C, the lower ends of which are hinged to said lugs, thimbles E, loosely mounted on said standards so as to slide over said lugs, and frame B, having a canvas covering and mounted on the upper ends of the standards, substantially as described.

4. The combination, with the shafts of the vehicle, of thimbles D, having lugs F, standards C, having their lower ends hinged to said lugs, thimbles E, and frame B, said frame being composed of folding sections, substantially as described.

In testimony whereof I affix my signature in presence of two witnesses.

AUGUSTUS D. BEEDLE.

Witnesses:
S. S. MOREHOUSE,
F. G. FISCHER.